United States Patent
Westenberger et al.

(10) Patent No.: US 8,430,237 B2
(45) Date of Patent: Apr. 30, 2013

(54) DEVICE AND METHOD FOR STORING HYDROGEN FOR AN AIRCRAFT

(75) Inventors: Andreas Westenberger, Buxtehude (DE); Oliver Thomaschewski, Hamburg (DE)

(73) Assignee: Airbus Operations GmbH (DE)

( * ) Notice: Subject to any disclaimer, the term of this patent is extended or adjusted under 35 U.S.C. 154(b) by 649 days.

(21) Appl. No.: 12/601,635

(22) PCT Filed: May 21, 2008

(86) PCT No.: PCT/EP2008/056264
§ 371 (c)(1),
(2), (4) Date: Nov. 24, 2009

(87) PCT Pub. No.: WO2008/145584
PCT Pub. Date: Apr. 12, 2008

(65) Prior Publication Data
US 2010/0170907 A1    Jul. 8, 2010
US 2013/0062354 A9   Mar. 14, 2013

Related U.S. Application Data

(60) Provisional application No. 60/932,789, filed on May 31, 2007.

(30) Foreign Application Priority Data

May 31, 2007   (DE) .......................... 10 2007 025 217

(51) Int. Cl.
*F17C 1/00* (2006.01)

(52) U.S. Cl.
USPC .......................................... 206/0.7; 220/560.1

(58) Field of Classification Search .................. 206/0.7; 220/560.04, 560.1, 560.12; 62/7, 607; 48/197 R, 48/61; 244/73 R, 50
See application file for complete search history.

(56) References Cited

U.S. PATENT DOCUMENTS

| | | | |
|---|---|---|---|
| 1,998,629 A | | 4/1935 | Lagarde |
| 3,971,847 A | * | 7/1976 | Houseman ................. 423/650 |
| 4,821,907 A | * | 4/1989 | Castles et al. ................. 62/430 |
| 5,373,701 A | | 12/1994 | Siefering et al. |
| 5,404,918 A | | 4/1995 | Gustafson |

(Continued)

FOREIGN PATENT DOCUMENTS

| | | |
|---|---|---|
| DE | 324662 C | 9/1920 |
| DE | 2443815 A1 | 4/1976 |

(Continued)

*Primary Examiner* — David Fidei
(74) *Attorney, Agent, or Firm* — Lerner, David, Littenberg, Krumholz & Mentlik, LLP

(57) ABSTRACT

The present invention relates to a tank device for storing hydrogen for an aircraft. The tank device comprises an outer tank and an inner tank. The inner tank is held in the outer tank. The outer tank is arranged such that the hydrogen with first physical characteristics can be stored. The inner tank is designed such that the hydrogen with second physical characteristics can be stored. The outer tank is connected to the inner tank such that the hydrogen can be fed to the inner tank from the outer tank. The inner tank is designed such that the hydrogen with the first physical characteristics can be converted to the hydrogen with second physical characteristics. The inner tank is arranged such that the hydrogen comprising the second physical characteristics can be fed to a consumer.

20 Claims, 3 Drawing Sheets

U.S. PATENT DOCUMENTS

| | | |
|---|---|---|
| 6,432,176 B1 | 8/2002 | Klos et al. |
| 6,672,077 B1 | 1/2004 | Bradley et al. |
| 6,932,958 B2 * | 8/2005 | Wangerow et al. ........... 423/652 |
| 7,305,836 B2 * | 12/2007 | Egan .............................. 62/45.1 |
| 7,850,034 B2 * | 12/2010 | Munshi et al. ........... 220/560.04 |
| 2002/0041823 A1 * | 4/2002 | Blaszczyk ........................ 422/1 |
| 2005/0056338 A1 | 3/2005 | Hertzler et al. |
| 2007/0144183 A1 * | 6/2007 | Sakajo ................................ 62/7 |
| 2007/0199941 A1 | 8/2007 | Reese |
| 2008/0006743 A1 | 1/2008 | Miller et al. |

FOREIGN PATENT DOCUMENTS

| | | |
|---|---|---|
| DE | 4320556 A1 | 12/1994 |
| DE | 4328962 | 3/1995 |
| DE | 19704360 C1 | 1/1998 |
| DE | 19704361 | 1/1998 |
| DE | 10105819 A1 | 8/2002 |
| DE | 102004010937 A1 | 9/2005 |
| DE | 102004061026 A1 | 6/2006 |
| EP | 1179702 A1 | 2/2002 |
| JP | 63125895 A | 5/1988 |
| JP | 07-027297 A | 1/1995 |
| JP | 07174296 A | 7/1995 |
| JP | 2002130595 A | 5/2002 |
| JP | 2002195499 A | 7/2002 |
| JP | 2005090747 A | 4/2005 |
| JP | 2005331043 A | 12/2005 |
| JP | 2008510115 A | 4/2008 |
| JP | 2009542502 A | 12/2009 |
| RU | 2284951 | 10/2006 |

* cited by examiner

DEVICE AND METHOD FOR STORING HYDROGEN FOR AN AIRCRAFT

CROSS-REFERENCE TO RELATED APPLICATIONS

This application is a national phase entry under 35 U.S.C. §371 of International Application No. PCT/EP2008/056264, filed May 21, 2008, published in English, which claims the benefit of the filing date of U.S. Provisional Patent Application No. 60/932,789 filed May 31, 2007 and of German patent application No. 10 2007 025 217.1 filed on May 31, 2007, the disclosures of which are hereby incorporated herein by reference.

FIELD OF THE INVENTION

The present invention relates to a tank device for storing hydrogen for an aircraft; to a method for storing hydrogen for an aircraft; to the use of a tank device for storing hydrogen in an aircraft; and to an aircraft comprising a tank device for storing hydrogen.

BACKGROUND OF THE INVENTION

In present-day aircraft, hydrogen is becoming increasingly more attractive as an energy carrier. In particular, the use of APU systems by fuel cells with a high degree of system integration is of particular interest as far as installation in aircraft is concerned. To this effect hydrogen tank equipment for aircraft becomes necessary that meets the stringent safety criteria for an aircraft.

SUMMARY OF THE INVENTION

In hydrogen tank systems, highly-insulated pressure tanks are used. For the rapid dynamic removal of large quantities of hydrogen the pressure tanks have to be heated. However, large, highly-insulated pressure tanks react rather passively during removal, so that in addition a reservoir tank is used that contains some of the hydrogen and provides it in a dynamic manner. However, the use of various tank elements increases both the installed volume and the weight.

There may be a need to create an efficient tank system for storing hydrogen.

According to an exemplary embodiment of the invention this need may be met by a tank device for storing hydrogen; a method for storing hydrogen in an aircraft; the use of a tank device for storing hydrogen in an aircraft; and an aircraft comprising a tank device for storing hydrogen according to the independent claims.

According to an exemplary embodiment of the present invention, a tank device for storing hydrogen for an aircraft is created. The tank device comprises an outer tank and an inner tank. The inner tank is held in the outer tank. Furthermore, the outer tank is arranged such that hydrogen with first physical characteristics can be stored. The inner tank is designed such that the hydrogen with second physical characteristics can be stored. The outer tank is connected to the inner tank such that the hydrogen can be fed to the inner tank. Furthermore, the inner tank is arranged such that the hydrogen with first physical characteristics can be converted to hydrogen with second physical characteristics. Furthermore, the inner tank is arranged such that the hydrogen with the second physical characteristics can be fed to a consumer.

According to a further exemplary embodiment of the invention, a method for storing hydrogen for an aircraft is created. First, hydrogen with first physical characteristics is stored in an outer tank. The hydrogen with first physical characteristics is fed from the outer tank to an inner tank. In this arrangement the hydrogen with first physical characteristics is converted to hydrogen with second physical characteristics. The hydrogen with second physical characteristics is subsequently fed to a consumer. In this arrangement the inner tank is held in the outer tank.

According to a further exemplary embodiment, the above tank device is used for storing hydrogen in an aircraft.

According to a further exemplary embodiment, an aircraft comprising the above-described tank device for storing hydrogen is created.

Hereinafter, the term "physical characteristics of the hydrogen" refers, for example, to the temperature, the pressure, the state of aggregation and the hydrogen concentration of hydrogen.

Furthermore, hydrogen can be present in high-purity form or in hydrogen compounds, for example metal hydrides.

With the present invention, a tank-in-tank concept is created by which part of the tank volume is provided in a second tank container, the inner tank, wherein the inner tank in a two-tank architecture is spatially integrated in a large outer tank. In this arrangement the large outer tank comprises hydrogen with first physical characteristics, which hydrogen can be conveyed by a pump or a valve to refill the holding tank or inner tank. Hydrogen that is stored in the inner tank is present with second physical characteristics and can be fed to a consumer.

In order to supply a user or consumer with hydrogen, certain physical characteristics of the hydrogen may have to be set so that a consumer can efficiently convert the hydrogen. In contrast to this, hydrogen with other physical characteristics can be stored better in a tank. With the present invention, the hydrogen may be preset to efficient physical conditions for a consumer, while at the same time comprising efficient physical characteristics for the storation in a tank. Thus, the hydrogen comprising first physical characteristics is present in the outer tank, which hydrogen comprises the first physical characteristics that are efficient for storing hydrogen. In the inner tank the hydrogen comprising second physical characteristics is present, which characteristics can be brought to physical characteristics that can efficiently serve a consumer. For example, hydrogen may be stored in the outer tank at high storage pressure and low temperature, while in the inner tank hydrogen is stored at low pressure and more elevated temperature, as required, for example, by the consumer.

In addition, with the tank-in-tank architecture according to the invention, it is possible, in particular, to make better use of the design and construction space while in addition less insulation effort can be sufficient. Furthermore, the inner tank is particularly well protected against external influences because it is protected by the outer tank. By providing hydrogen comprising second physical characteristics in the inner tank it is furthermore possible to improve the dynamic response behaviour since, due to the short bridging paths between the outer tank and the inner tank, it is possible in an extremely short period of time to continuously and rapidly provide hydrogen comprising second physical characteristics. Moreover, the safety aspects are not reduced but instead they are improved due to the inner tank being better protected.

As a result of an inner tank being formed in the outer tank, in addition, evaporated hydrogen from the inner tank can automatically be collected by the outer tank so that it is no longer necessary to provide two tanks with a heavy insulation weight. By the tank-in-tank system it is furthermore possible to provide redundancy, for example should the inner tank become damaged. In this arrangement, in the case of a defect, the outer tank can collect the quantity of water contained in the inner tank. Moreover, by emergency jettison options, the hydrogen contained in the outer tank can be released in a targeted manner to the environment, wherein a small determined quantity of hydrogen with second physical characteristics can continue to be stored in the inner tank so that at least a small portion of hydrogen can be available in the case of emergency in order to provide emergency running characteristics. Moreover, the crash safety may be improved in this way.

Hydrogen comprising second physical characteristics, which hydrogen can efficiently be converted in a consumer, is very difficult to store in a tank because of these second physical characteristics. Due to the evaporation characteristics of the hydrogen at low pressure and high temperature, heavy insulation devices are frequently required which nonetheless are barely able to collect hydrogen comprising second physical characteristics before evaporation. With the present tank-in-tank architecture, evaporation of hydrogen comprising second physical characteristics from the inner tank can be collected using the outer tank, without there being a need to provide additional insulation characteristics. Loss of hydrogen due to evaporation can thus be reduced, and safety aspects can be improved without the need for expensive and heavy insulation devices.

According to a further exemplary embodiment, the outer tank comprises a first insulation layer. This first insulation layer is therefore designed such as to prevent the hydrogen comprising the first physical characteristics from emerging. Hydrogen has volatile characteristics and tends to evaporate from a container. By a strongly built first insulation layer such evaporation can be reduced. Furthermore, the hydrogen can, for example, be kept at first physical characteristics. Consequently, those first physical characteristics of the hydrogen can be provided which are suitable for storing the hydrogen. For example, by the first insulation layer the hydrogen can be kept at a defined low temperature, high pressure, or a defined state of aggregation.

According to a further exemplary embodiment, the inner tank comprises a second insulation layer, wherein the second insulation layer differs from the first insulation layer. In the inner tank the hydrogen comprising second physical characteristics can be stored, wherein the second physical characteristics are such that they can be efficiently converted at a user. These second physical characteristics can, however, have inferior storage characteristics, because, for example, they show a higher evaporating behavior more readily, due to higher temperature or reduced pressure. Nevertheless, the tank-in-tank architecture provides the option of designing the second insulation layer of the inner tank thinner than, or different from the first insulation layer of the outer tank. While in this way hydrogen comprising second physical characteristics can evaporate more easily from the inner tank, this hydrogen is, however, collected by the outer tank.

According to a further exemplary embodiment of the invention, the second insulation layer differs from the first insulation layer in that the second insulation layer is constructed so as to be thinner and weaker than the first insulation layer which is designed thicker and stronger. Due to a strong first insulation layer of the outer tank, hydrogen that has evaporated from the inner tank can nevertheless be prevented from evaporating to the environment. In the outer tank, the evaporated hydrogen can be reset to the first physical characteristics. Consequently, weight savings can be achieved in the insulation layers because it is not necessary to use two insulation layers that are equally strong and thick and thus heavy in weight.

According to a further exemplary embodiment, furthermore, a conversion contrivance is used. The conversion contrivance is designed such that the hydrogen with first physical characteristics can be converted to the hydrogen with second physical characteristics. The conversion contrivance can comprise at least one heating element, one cooling element and one pressure control element. The conversion device can further be formed by the group comprising heating elements, cooling elements and pressure control elements. For example, if hydrogen comprising first physical characteristics is conveyed from the outer tank to the inner tank, then by the conversion contrivance the hydrogen can be converted to hydrogen comprising second physical characteristics. If the hydrogen is, for example, stored in the outer tank at extremely high pressure and low temperature, then by heating elements or pressure control elements the hydrogen can be heated and relaxed so that hydrogen comprising second physical characteristics can be present in the inner tank. By the conversion contrivance hydrogen comprising second physical characteristics can permanently be provided and resupplied so that hydrogen with efficient physical characteristics can be provided to a consumer.

According to a further exemplary embodiment, the tank device further comprises an outer-tank control device. The outer-tank control device is designed such that in the outer tank the hydrogen comprising first physical characteristics can be set. The outer-tank control device can comprise at least one heating element, one cooling element and one pressure control element. Furthermore, the outer-tank control device can be selected from the group comprising heating elements, cooling elements and pressure control elements. By the outer-tank control device there is the option of setting the first physical characteristics of the hydrogen such that physical characteristics are present that are suitable for storing the hydrogen. Thus, by the outer-tank control device it is possible, for example, to reduce or increase a hydrogen temperature or to set a particular pressure. Consequently, evaporation of the hydrogen can be reduced in that first physical characteristics of the hydrogen can be set, by which characteristics hydrogen has a reduced evaporation characteristics.

According to a further exemplary embodiment, the tank device further comprises a compressor. The compressor is arranged to convey hydrogen from the outer tank to the inner tank so that due to a first pressure of the hydrogen in the outer tank and a different second pressure of the hydrogen in the inner tank, filling of the inner tank with hydrogen from the outer tank can be implemented more rapidly. In other words, on the one hand the hydrogen can be conveyed due to a difference in pressure between the inner tank and the outer tank, and on the other hand a compressor can be used for more rapid filling of the inner tank. Consequently, hydrogen can rapidly be provided to the inner tank so that in case of a rapid reduction of the hydrogen by a consumer from the inner tank an adequate quantity of hydrogen can continuously be provided.

According to a further exemplary embodiment, the tank device further comprises an inner-tank safety valve. The inner-tank safety valve is designed to let the hydrogen from the inner tank off into the outer tank. In case physical characteristics of the hydrogen in the inner tank reach a critical state, by an inner-tank safety valve this hydrogen can be let off into the outer tank. Consequently, it is possible to prevent that the inner tank is destroyed in case that critical physical characteristics of the hydrogen occur.

According to a further exemplary embodiment, the tank device further comprises an outer-tank safety valve. The outer-tank safety valve can be designed such that it lets off the hydrogen from the outer tank in a targeted manner to the environment. If critical characteristics of the hydrogen occur, by way of an outer-tank safety valve the hydrogen can be let off in a targeted manner. Furthermore, by the outer-tank safety valve the hydrogen can be let off at a particular location, for example from an aircraft to the environment. Consequently, the safety in an aircraft can be improved.

According to a further exemplary embodiment, the tank device further comprises a feed device. The feed device is provided in such a manner on the outer tank that a filling device for filling hydrogen into the outer tank can be connected. The filling device can, for example, be arranged in such a manner on the outer tank that a connection on the aircraft fuselage is provided so that from the outside a tank equipment can be connected. Furthermore, this feed device can comprise standardised couplings so that a host of different filling devices for filling the tank with hydrogen can be connected. Consequently, the outer tank can be filled with hydrogen in an easy way.

According to a further exemplary embodiment, the feed device comprises a standardised and interchangeable coupling. The coupling is designed such that a host of different filling devices can be connected. Consequently, the tank device can be connected to various tank equipment without this requiring major retrofitting measures. By the standardised coupling, hydrogen can be procured from a host of different filling devices. Consequently, retrofitting times and refuelling times can be reduced.

According to a further exemplary embodiment, the outer tank comprises a bursting-disc element. The bursting-disc element is designed such that when hydrogen with critical physical characteristics is present, the bursting-disc element can be deformed, and the hydrogen with critical physical characteristics can be let off to the environment in a targeted manner. Consequently, in case of emergency situations the bursting-disc elements can be deformed in a targeted manner so that at a targeted location the hydrogen can escape to an environment. The environment can be an aircraft cabin or the aircraft environment itself Consequently, the system safety of the tank device can be improved. Furthermore, in a further exemplary embodiment the inner tank can comprise bursting-disc elements that allow the hydrogen to flow into the outer tank.

The environment can be an aircraft cabin or the aircraft environment itself This means that, by bursting-disc elements or valves, hydrogen can be discharged from the tank device to an aircraft cabin or to an external aircraft environment outside the aircraft cabin.

According to a further exemplary embodiment, the inner tank comprises a further bursting-disc element. The further bursting-disc element is designed such that in case of the presence of hydrogen with critical physical characteristics, the further bursting-disc element can be deformed, and the hydrogen with critical physical characteristics can be released to the outer tank in a targeted manner. Consequently, the hydrogen with critical physical characteristics can rapidly and without interruption be diverted to the outer tank. Consequently, it is possible, for example, to prevent the inner tank from bursting. In addition, the hydrogen with critical physical characteristics in the outer tank can be converted to hydrogen with first physical characteristics.

According to a further exemplary embodiment, the tank device further comprises a control device and an inner-tank sensor. The inner-tank sensor can be arranged in the inner tank such that the second physical characteristics of the hydrogen are measurable. The control device is designed such that the control device controls the conversion device depending on measured data from the inner-tank sensor. The inner-tank sensor can measure physical values, for example temperature or pressure of the hydrogen, and can convey these values to a control device. Based on predetermined target-value data or input data, said control device can automatically control the conversion contrivance and in this way reduce or increase temperature, or increase or reduce pressure. Consequently, it is permanently ensured that the second physical characteristics of the hydrogen are provided in the inner tank. The same can be implemented in the outer tank by providing an outer-tank sensor.

According to a further exemplary embodiment, the inner tank is designed so as to be integral with the outer tank. Consequently, the outer tank and the inner tank can be constructed as a unit, namely in one piece and as an integral design, so that improved stability is achievable. Furthermore, due to the integral design the weight can be reduced. The term "integral" means that the outer tank can be designed as a unit with the inner tank, for example in an integral design.

According to a further exemplary embodiment, the tank device further comprises a fastening device. The fastening device is designed such that the fastening device holds the inner tank so that the latter is spaced apart from the outer tank. Consequently, by the fastening device, the inner tank can be held so that it is spaced apart from the outer tank so that contact between the inner tank and the outer tank is prevented. Furthermore, the fastening device can comprise damping elements that can protect the inner tank against vibration and shocks. By the spacing between the inner tank and the outer tank, improved insulation characteristics can be implemented because the inner tank is held without contact to the outer tank.

According to a further exemplary embodiment, the fastening device comprises damping elements. The damping elements are designed to absorb shocks and vibration between the inner tank and the outer tank. The damping elements can comprise a shock-absorbing damping material or hydraulic or pneumatic shock absorbers. Consequently, vibration of the inner tank can be prevented, particulary as hydrogen with the second physical characteristics can be more easily flammable.

According to a further exemplary embodiment, the tank device comprises a plurality of inner tanks. The plurality of inner tanks are also held in the outer tank and comprise the same characteristics as the inner tank described above. Consequently, each of the inner tanks can hold hydrogen with second physical characteristics. In this way the tank device can provide the hydrogen to the user in a more dynamic manner, because in the case where an inner tank runs empty, hydrogen can rapidly and without interruption be taken from a further inner tank. At the same time the empty inner tank can take up hydrogen again. In addition, each of the inner tanks can hold hydrogen comprising different physical characteristics and can provide hydrogen to different consumers. Consequently, the physical characteristics of the hydrogen in each of the inner tanks can be adjusted to the requirements of a particular consumer. Consequently, the system effectiveness can be improved.

According to a further exemplary embodiment of the method, the first hydrogen comprises a first pressure and a first temperature, and the second hydrogen comprises a second pressure and a second temperature. The first pressure is higher than the second pressure, and the first temperature is lower than the second temperature. Consequently, the hydrogen in the outer tank comprises first physical characteristics that are suitable for storage in a tank. Hydrogen can, for example, be stored at high pressure and low temperature in a gaseous or liquid state of aggregation, as a result of which at the same time evaporation of hydrogen from the outer tank is reduced. In the inner tank the hydrogen can comprise a lower pressure and a higher temperature, wherein this hydrogen comprising these second physical characteristics can be converted by a consumer at a higher degree of efficiency. While in this way the evaporation characteristics of the hydrogen comprising second physical characteristics are increased, any evaporated hydrogen is, however, collected by the outer tank. Consequently, the first and second physical characteristics of the hydrogen can always be set according to their use, i.e. for storage or for combustion, so that the efficiency of the entire tank device is improved as far as weight savings and hydrogen consumption are concerned.

The exemplary embodiments of the tank device also apply to the method, to the use, and to the aircraft, and vice-versa.

BRIEF DESCRIPTION OF THE DRAWINGS

Below, for further explanation and to provide a better understanding of the present invention, exemplary embodiments are described in more detail with reference to the enclosed drawings. The following are shown.

DETAILED DESCRIPTION OF THE EXEMPLARY EMBODIMENTS

Figure 1:
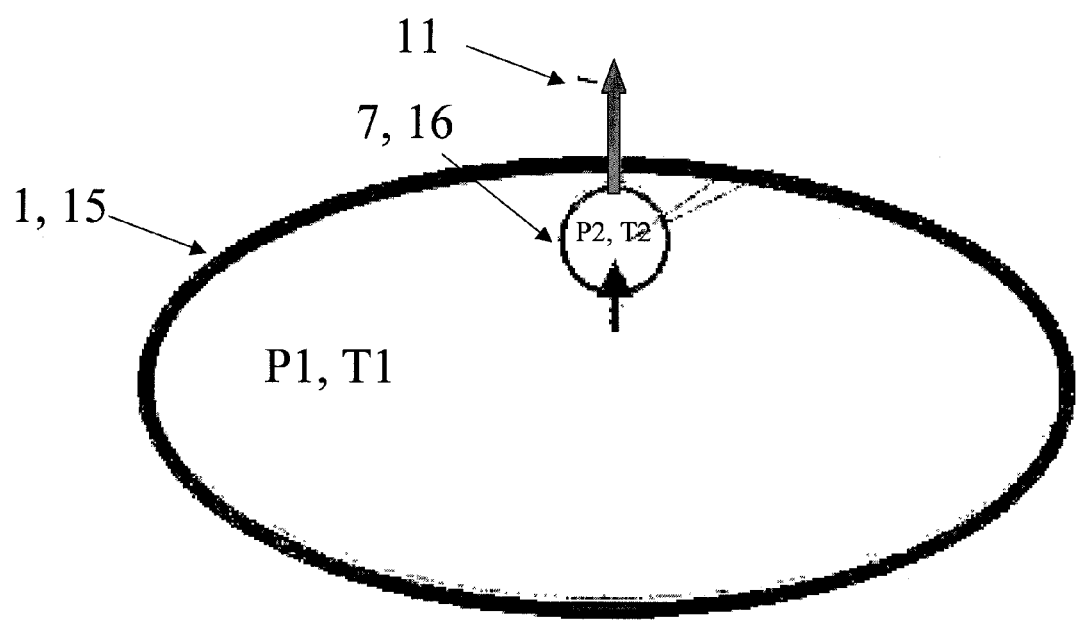
FIG. 1 a diagrammatic view of the basic principle of the tank device according to an exemplary embodiment of the invention.

Identical or similar components in different figures have the same reference characters. The illustrations in the figures are diagrammatic and not to scale.

FIG. 1 shows a first exemplary embodiment of the present invention. A tank device for storing hydrogen for an aircraft is shown. The tank device comprises an outer tank 1 and an inner tank 7. In this arrangement the inner tank 7 is held in the outer tank 1. In this arrangement the outer tank 1 is designed such that the hydrogen with first physical characteristics can be stored. The inner tank 7 is designed such that the hydrogen comprising second physical characteristics can be stored. The outer tank is connected to the inner tank 7 such that the hydrogen can be fed to the inner tank 7. The inner tank 7 is designed such that the hydrogen with first physical characteristics can be converted to the hydrogen with second physical characteristics. The inner tank 7 is designed such that the hydrogen with the second physical characteristics can be fed to a consumer.

The outer tank 1 or cryotank comprises thick insulation 15, wherein the inner tank 7 can comprise light insulation 16. In this arrangement the outer tank stores hydrogen with first physical characteristics, for example at a pressure P1 and a temperature T1. This hydrogen can be fed to the inner tank, wherein at the same time the hydrogen with first physical characteristics can be converted to hydrogen with second physical characteristics. These second physical characteristics comprise, for example, a lower pressure P2 or a higher temperature T2. From this inner tank 7, by way of a removal device 11, the hydrogen with second physical characteristics can be provided to a consumer.

Under the first physical characteristics the first temperature T1 and the first pressure P1 can be allocated. Under the second physical characteristics the second temperature T2 and the second pressure P2 can be allocated.

Figure 2:
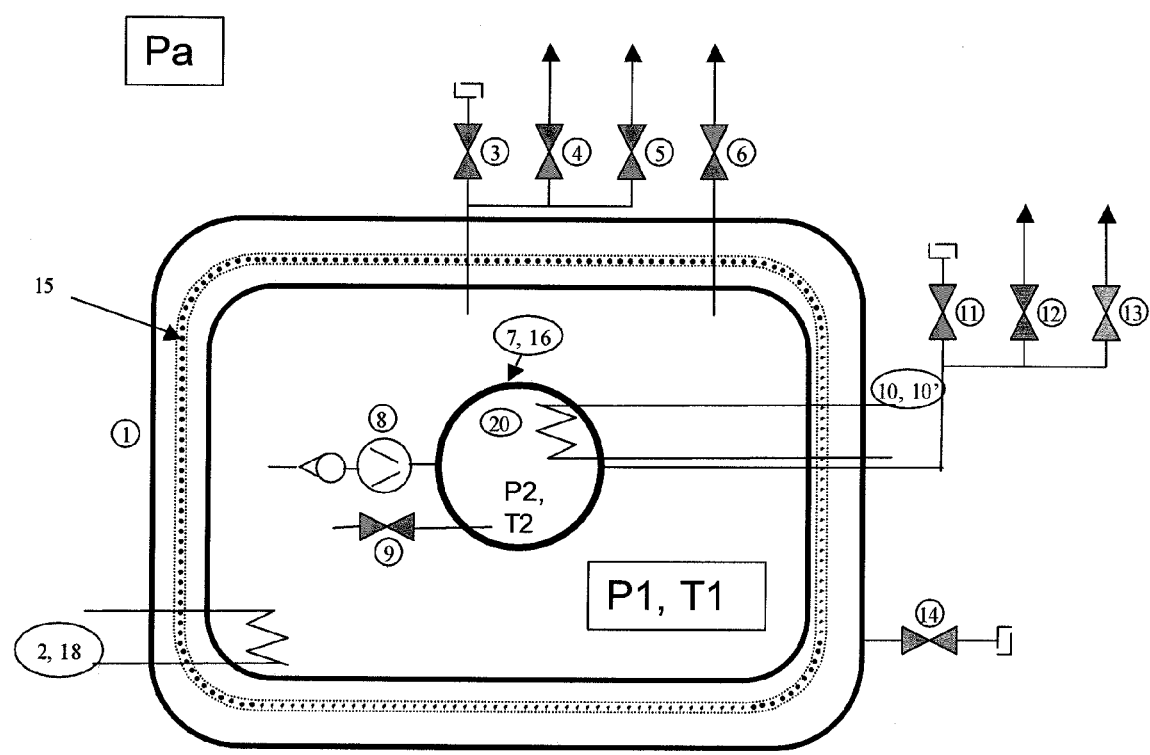
FIG. 2 a diagrammatic view of a tank device with additional components according to an exemplary embodiment of the present invention.

FIG. 2 shows a diagrammatic view of the tank device according to the invention with possible additional components according to an exemplary embodiment of the invention. In this arrangement the outer tank 1 comprises thick outer insulation 15. The first physical characteristics of the hydrogen in the outer tank 1 can, for example, be set by way of an outer-tank control device 18, for example a heating device or an outer-tank compressor or a valve 4. By way of a feed device 3, hydrogen can be supplied to the outer tank 1. There is thus the option of providing a particular pressure P1 and a particular temperature T1 by a heater 2.

Furthermore, FIG. 2 further shows the inner tank 7 that comprises thin inner insulation 16. In the inner tank 7, the hydrogen comprising second physical characteristics can be provided, for example at a pressure P2 or a temperature T2. By a conversion contrivance 10, which, for example, comprises heating elements 10' or pressure control elements 8, the second interior pressure P2 or the second temperature T2 can be set. In this arrangement the second pressure P2 and the second temperature T2 are set such that hydrogen comprising these physical characteristics achieves good efficiency at a consumer. By way of a feed line 11, the hydrogen from the inner tank 7 can be fed to the consumer.

Furthermore, the inner tank 7 comprises an inner-tank safety valve 9, as a result of which arrangement hydrogen comprising critical physical characteristics, for example increased pressure or excessive temperature, can be let off into the outer tank 1.

For faster filling of the inner tank 7 with hydrogen from the outer tank 1, a compressor 8 can be used which provides rapid conveyance of hydrogen into the inner tank 7.

The outer tank 1 further comprises bursting discs 5, 6 which are deformable in case of critical physical first characteristics of the hydrogen and convey the hydrogen rapidly and without interruption from the outer tank 1 to an aircraft environment with an ambient pressure of Pa. Likewise, the inner tank 7 can comprise bursting-disc elements 12, 13 which in the case of critical physical characteristics of the hydrogen can be deformed and can give off the hydrogen to the outer tank 1.

The outer tank 1 can furthermore comprise an outer-tank control device 18 that controls the heater 2 or a vacuum valve 14 in a targeted manner in order to set first physical characteristics of the hydrogen, for example a first pressure P1 and a first temperature T1.

The inner tank 7 can, furthermore, comprise an inner-tank sensor 20 which permanently measures the second physical characteristics of the hydrogen and can transmit them, for example, to a control device. Based on the measured sensor data, the control device can control the conversion contrivance 10 in a targeted manner so that the hydrogen comprising defined second physical characteristics is permanently present.

Figure 3:
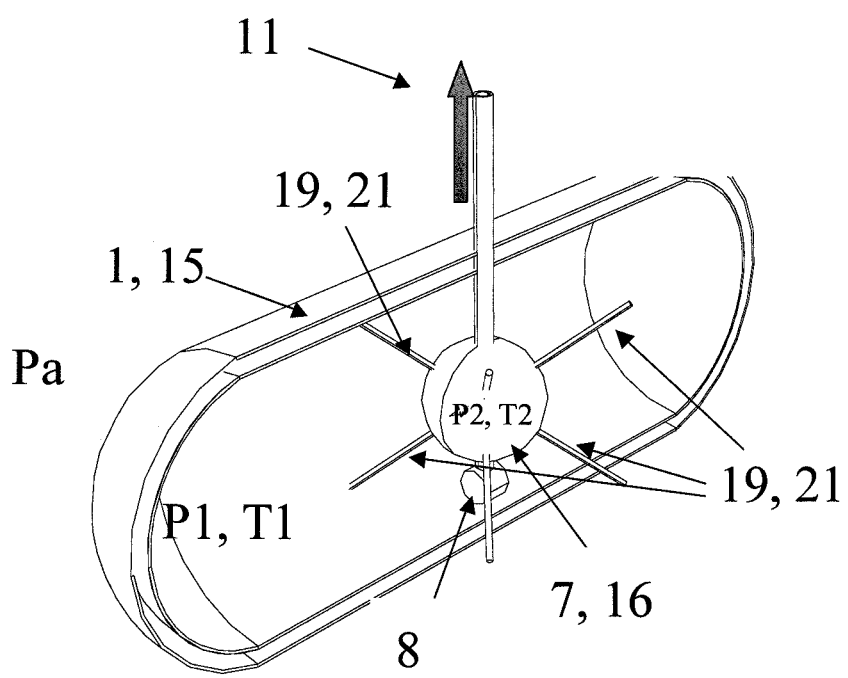
FIG. 3 a diagrammatic view of the way an inner tank is held in the outer tank according to an exemplary embodiment of the present invention.

FIG. 3 shows an exemplary arrangement of holding the inner tank 7 in the outer tank 1. In this arrangement the outer tank 1 comprises thick strong external insulation 15.

In this arrangement the inner tank 7 is held, by a fastening contrivance 21, so as to be spaced apart. In addition, the inner tank 7 can comprise no insulation or a thin, light-weight second insulation layer 16. The fastening contrivance 21 can keep the inner tank 7 spaced apart, for example, by way of rod systems. Furthermore, damping elements 19 can be arranged on such rod systems so that the inner tank 7 absorbs less in the way of shocks and vibration from the outer tank 1. This can improve safety because the inner tank 7 frequently holds hydrogen that comprises favourable combustion characteristics for a consumer, which hydrogen should therefore be stored in a highly sensitive manner.

The inner tank 7 further comprises a removal device 11 by which the hydrogen with second physical characteristics can be fed to a consumer. For the purpose of filling the inner tank 7 with hydrogen from the outer tank 1, a compressor 8 can be used so as to also increase the filling speed.

In addition, it should be pointed out that "comprising" does not exclude other elements or steps, and "a" or "one" does not exclude a plural number, and that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A tank device for storing hydrogen for an aircraft, wherein the tank device comprises:
   an outer tank;
   an inner tank;
   wherein the inner tank is held in the outer tank;
   wherein the outer tank is configured to store hydrogen with first physical characteristics;
   wherein the inner tank is configured to store hydrogen with second physical characteristics;
   wherein the inner tank is configured to store hydrogen with a lower pressure and a higher temperature than the pressure and the temperature of the hydrogen in the outer tank;
   wherein the outer tank is connected to the inner tank and is configured to feed the hydrogen from the outer tank to the inner tank; and
   a conversion contrivance configured to convert the hydrogen with the first physical characteristics from the outer tank to hydrogen with the second physical characteristics and to feed the converted hydrogen to the inner tank;
   wherein the inner tank is configured to feed the hydrogen with the second physical characteristics from the inner tank to a consumer;
   wherein the outer tank comprises a first insulation layer; and
   wherein the inner tank comprises a second insulation layer.

2. The tank device of claim 1,
   wherein the second insulation layer differs from the first insulation layer.

3. The tank device of claim 2,
   wherein the second insulation layer differs from the first insulation layer in that the second insulation layer is constructed thinner and weaker than the first insulation layer which is configured to be thicker and stronger.

4. The tank device of claim 1,
   wherein the conversion contrivance comprises at least one heating element, one cooling element and one pressure control element.

5. The tank device of claim 1,
   wherein the conversion contrivance is selected from the group consisting of a heating element, a cooling element and a pressure control element.

6. The tank device of claim 1, further comprising:
   an outer-tank control device;
   wherein the outer-tank control device is configured to set in the outer tank the hydrogen comprising the first physical characteristics; and
   wherein the outer-tank control device is selected from the group consisting of a heating element, a cooling element and a pressure control element.

7. The tank device of claim 6,
   wherein the outer-tank control device comprises at least one heating element, one cooling element and one pressure control element.

8. The tank device of claim 1, further comprising:
   a compressor;
   wherein the compressor is arranged to convey hydrogen from the outer tank to the inner tank so that due to a first pressure of the hydrogen in the outer tank, and a different second pressure of the hydrogen in the inner tank, filling of the inner tank with hydrogen from the outer tank is configured to be implemented more rapidly.

9. The tank device of claim 1, further comprising:
   an inner-tank safety valve;
   wherein the inner-tank safety valve is configured to discharge the hydrogen from the inner tank off into the outer tank.

10. The tank device of claim 1, further comprising:
    an outer-tank safety valve;
    wherein the outer-tank safety valve is configured to discharge the hydrogen from the outer tank in a targeted manner to the environment.

11. The tank device of claim 1, further comprising:
    a feed device;
    wherein the feed device is provided in such a manner on the outer tank so as to connect to a filling device for filling hydrogen into the outer tank.

12. The tank device of claim 11,
    wherein the feed device comprises a standardized and interchangeable coupling;
    wherein the coupling is configured to connect to a host of different filling devices.

13. The tank device of claim 1,
    wherein the outer tank comprises a first bursting-disc element;
    first bursting-disc element is configured such that when hydrogen with critical physical characteristics is present, the bursting-disc element is deformed, and to let off the hydrogen with critical physical characteristics to the environment in a targeted manner.

14. The tank device of claim 1,
    wherein the inner tank comprises a second bursting-disc element;
    wherein the second bursting-disc element is configured such that when hydrogen with critical physical characteristics is present, the second bursting-disc element is deformed, and to give off the hydrogen with critical physical characteristics to the outer tank in a targeted manner.

15. The tank device of claim 1, further comprising:
    a control device; and
    an inner-tank sensor;
    wherein the inner-tank sensor is arranged in the inner tank such that the second physical characteristics of the hydrogen are measurable;
    wherein the control device is designed such that the control device controls the conversion device depending on measured data from the inner-tank sensor.

16. The tank device of claim 1,
    wherein the inner tank is configured integrally with the outer tank.

17. The tank device of claim 1, further comprising:
a fastening device;
wherein the fastening device is arranged such that the fastening device holds the inner tank so that the latter is spaced apart from the outer tank.

18. The tank device of claim 17,
wherein the fastening device comprises damping elements;
wherein the damping elements are arranged to absorb shocks and vibration between inner tank and outer tank.

19. The tank device of claim 1, further comprising:
a plurality of inner tanks;
wherein the plurality of inner tanks are stored in the outer tank.

20. An aircraft comprising a tank device for storing hydrogen, the tank device comprising:
an outer tank;
an inner tank;
wherein the inner tank is held in the outer tank;
wherein the outer tank is configured to store hydrogen with first physical characteristics;
wherein the inner tank is configured to store hydrogen with second physical characteristics;
wherein the inner tank is configured to store hydrogen with a lower pressure and a higher temperature than the pressure and the temperature of the hydrogen in the outer tank;
wherein the outer tank is connected to the inner tank and is configured to feed the hydrogen from the outer tank to the inner tank; and
a conversion contrivance configured to convert the hydrogen with the first physical characteristics from the outer tank to hydrogen with the second physical characteristics and to feed the converted hydrogen to the inner tank;
wherein the inner tank is configured to feed the hydrogen with the second physical characteristics from the inner tank to a consumer;
wherein the outer tank comprises a first insulation layer; and
wherein the inner tank comprises a second insulation layer.

* * * * *